W. E. BALDWIN.
CHARGING TRUCK.
APPLICATION FILED DEC. 22, 1914.
1,182,960.
Patented May 16, 1916.
2 SHEETS—SHEET 1.
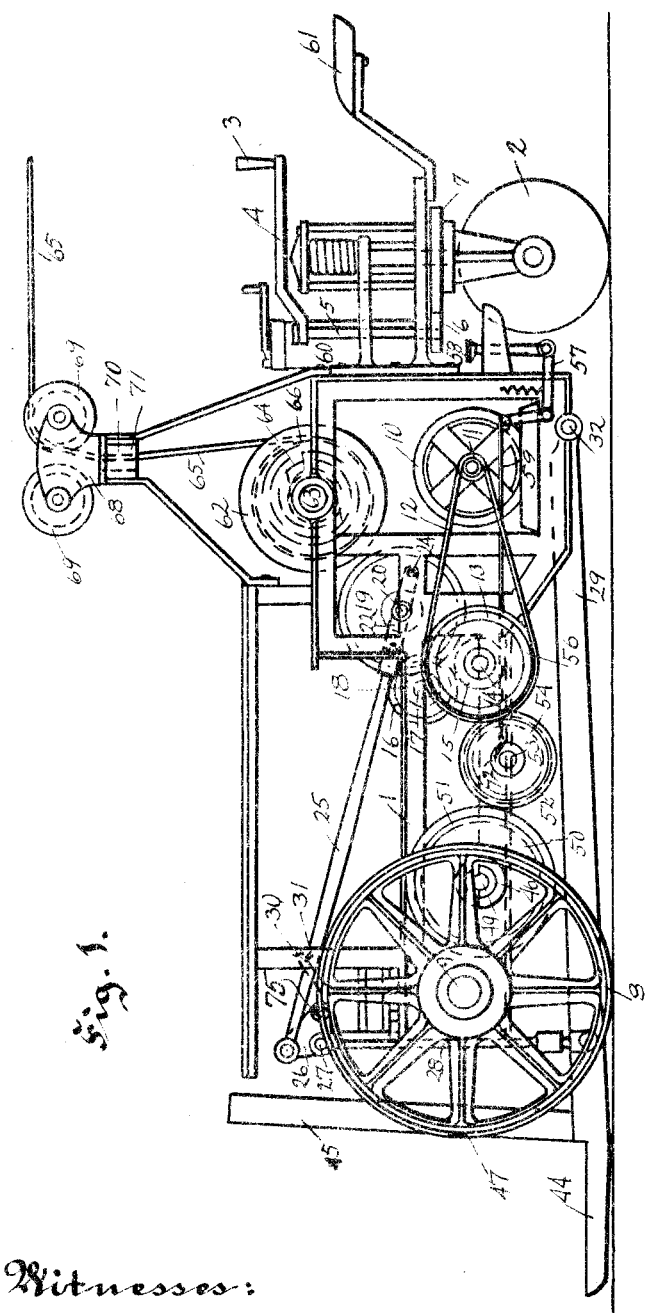
Witnesses:
M. A. Willett
J. A. Bates
Inventor
William E. Baldwin,
by George Francis Myers,
Attorney.

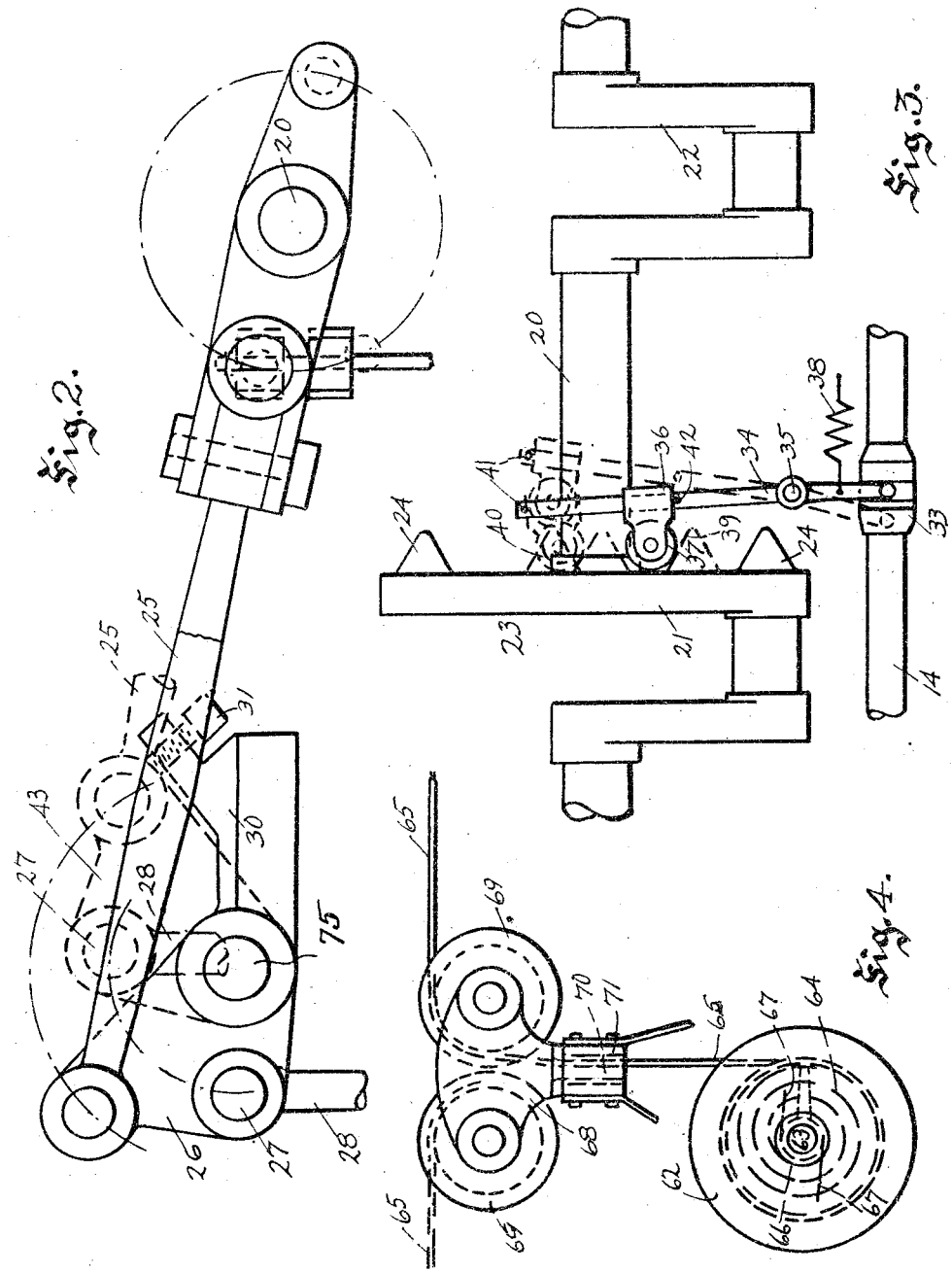

UNITED STATES PATENT OFFICE.

WILLIAM E. BALDWIN, OF BUFFALO, NEW YORK.

CHARGING-TRUCK.

1,182,960. Specification of Letters Patent. Patented May 16, 1916.

Application filed December 22, 1914. Serial No. 878,518.

*To all whom it may concern:*

Be it known that I, WILLIAM E. BALDWIN, a citizen of the United States, residing at Buffalo, in the county of Erie and State of New York, have invented new and useful Improvements in Charging-Trucks, of which the following is a specification.

This invention relates to charging trucks for carrying the heavy flasks of annealed iron castings from place to place, although the machine may be used for other purposes as well.

The object of the invention is to provide a machine, simple in construction, that may be operated by electric power from a central point. Practically all foundries now have the electric current, and the herein described invention discloses a machine that can be driven from place to place without the use of a fixed trolley wire. Not only is the machine moved around the foundry by the electric current, but the lifting mechanism is also operated by the same power.

The invention also relates to certain details of construction which will be hereinafter described and claimed.

In the accompanying drawings, Figure 1 is a side elevation of the preferred form of a machine embodying the invention. Fig. 2 is a side elevation of the mechanism of the lifting device. Fig. 3 is a front elevation of the gravity clutch operating mechanism. Fig. 4 is a detail of the self centering pivoted double wheeled trolley and reel therefor.

Similar numerals of reference indicate similar parts throughout the several views.

Briefly the machine consists of a substantially one-piece fixed longitudinal frame, and a movable frame pivoted to the same, which movable frame is lifted and lowered by means of a rocker shaft and controlled by a gravity clutch release.

The fixed frame 1 is equipped at one end with a steering wheel 2 operated by the handle 3, lever 4, rod 5 and sprockets 6 and 7. At the forward end are the driving wheels 8 on axles 9. The motor 10 with sprocket wheel 11 and chain 12, drives the sprocket sleeve clutch revolving loose on shaft 14. On the said shaft 14 is the pinion 15 meshing with wheel 16 on shaft 17. On the shaft 17 is the pinion 18 meshing with wheel 19 on the crank shaft 20.

The crank shaft 20 is preferably provided with two sets of double cranks 21 and 22, one of which has a prolongation 23 on either side of the crank shaft and parallel to the said crank. At the end of the said crank and also at the end of the said prolongation thereof are two projections or cam fingers 24. The said cranks 21 and 22 drive the two connecting rods 25, and rock the cranks 26 on the rocker shaft 75. Attached to the said cranks 26 are the links 28 on shaft 27 connected to the pivoted frame 29. Rests 30 with adjusting screws 31 help hold up the pivoted frame 29 when loaded. Therefore as the cranks 21 and 22 rotate they will oscillate the cranks 26 on the rocker shaft 75, and cause the pivoted frame 29 to move up and down on its pivots 32, and thus lift the load at the forward end of the said pivoted frame and then at the option of the operator by means of any ordinary lever, preferably a foot controlled lever (not shown) controlling the clutch 33 will raise or lower the load.

In order to stop the movement of the pivoted frame 29 at any predetermined point the clutch 33 on shaft 14 is operated by the lever 34 on fulcrum 35. On the upper part of the lever 34 is the sliding piece 36 holding the roller 37. When one of the said projections 24 on the crank 21 or on its prolongation 23 strikes the said roller 37 as at 39 (the roller 37 being in its normal position) the said projection will lift up the said roller into the position 40, a stop 41 preventing the said roller from traveling higher. As the projection continues to revolve, the roller 37, being prevented from traveling any farther in an upward direction, the said roller will be pushed back, and the lever 34 will release the clutch 33 and thereby stop the rotation of the crank shaft 20. The slide 36 with roller 37 will of course slide down the lever 34 until the said slide strikes the stop 42, when the roller will be in its initial or normal position again ready to be thrown in by the said foot controlled lever.

During the time of the half revolution of the crank 21 the connecting rods 25 have pulled over the cranks 26 on the rocker shaft 75 to the dotted position 43 as shown in Fig. 2. The links 28 have been lifted and with them the pivoted frame 29. At the outer end of the said pivoted frame are the forward arms 44, which receive the load of flasks above spoken of. Directly back of these forward arms is the vertical frame 45 keeping the flasks from falling over backward onto the machine. When it is desired to lower the pivoted frame 29 again the same foot lever may be operated throwing in the clutch 33 and then another half revolution of the said crank 21, during which the operation of the said lever, roller and the clutch is the same as above described, will lower the said links and the said pivoted frame is ready to receive the load again. Therefore during each full revolution of the crank 21 the crank on the rocker shaft will oscillate, and lift and then lower the load; but by means of the gravity clutch mechanism comprising the roller 37, lever 34 and clutch 33, the crank on the rocker shaft is held in either its backward or forward position until automatically released by the projection 24 striking the roller 37 and thereby throwing out the clutch 33 when either the load is at its highest or at its lowest position, and the load will remain there.

The turning of the driving wheels is accomplished by the pinion 46 meshing with the internal gear 47 on the inside of the rim 48 of the said wheels, (the pitch line only of the gears being shown). The pinion 46 is driven by the shaft 49 through the differential 50, and on the same shaft 49 is the gear 51 driven by the gear 52 on the shaft 53. The gear 54 on the shaft 53 meshes in the gear 56 on the said sleeve clutch revolving loose on shaft 14, which as before pointed out is driven by the sprocket wheel 13 which is driven by the chain 12 and pinion 11 and motor 10.

The lever 57 by means of the pedal 58 and rod 59 operates a clutch 72 on the shaft 53 to drive the machine forward or backward. The controller 60 starts and stops the motor 10 and reverses the same so that the machine can be driven forward or backward at pleasure, by the operator seated at 61.

The stationary source of power from which the motor receives its energy is often located at a distant point from the furnaces, and the machine must travel in more or less of an irregular path, receiving its energy from a cable. But as the machine must travel back and forward over the same ground very often, a reel or drum 62 is provided turning on shaft 63. A spring 64 is coiled inside of the reel 62 and fastened both to the said shaft and to the reel 62, so that as the cable 65 unwinds the said spring is placed in tension ready to wind up the said cable again as soon as the machine retraces its path. A commutator 66 with brushes 67 takes off the current and delivers it to the motor 10.

The trolley harp 68 carries two trolley wheels 69 so that the cable 65 may pass from one to the other readily. Below the trolley harp 68 is the vertical shaft 70 rotatable in the socket 71, allowing the wheels 69 to always be in line with the above mentioned source of power.

I do not limit myself to the exact design as shown and described, as I may vary the same without departing from the spirit of my invention

I claim:—

1. A charging frame comprising a fixed frame, a pivoted frame, and means for lifting the said pivoted frame comprising a motor, a driving shaft, a rotating crank attached thereto, a cam finger mounted on the said crank, and means to arrest the said rotating crank at any predetermined point.

2. A charging truck comprising a fixed frame, a pivoted frame, and means for lifting the said pivoted frame comprising a motor, a driving shaft, a rotating crank attached thereto, a cam finger mounted on the said crank, and means to arrest the said rotating crank at any predetermined point the said means comprising a clutch release from the said motor.

3. A charging truck comprising a motor, a crank driven by the said motor, a projection on the said crank, a roller adapted to be both moved along and then pushed aside by the said projection, a lever upon which the said roller slides, and a clutch operated by the said lever.

4. A charging truck comprising a motor, a crank driven by the said motor, a projection on the said crank, a roller adapted to be moved vertically and then pushed aside by the said projection, a lever upon which the said roller slides vertically, and a clutch released by the said lever.

5. A charging truck comprising a motor, a crank driven by the said motor, a prolongation of the said crank, a projection on the said crank, a similar projection on the said prolongation, a roller adapted to be moved vertically and then pushed aside by the said projections, a lever upon which the said roller slides vertically, and a clutch release by the said lever.

6. A charging truck comprising a motor, a shaft driven by the said motor, parallel arms extending on either side of the said shaft, a lever, a clutch operated by the said lever, means attached to the said arms for moving the said roller along the said lever during part of the revolution of the said arms and finally moving the said lever on its fulcrum thereby throwing out the said clutch, and means for bringing the said roller back to its initial position.

WILLIAM E. BALDWIN.

In the presence of—
T. M. CROWE,
L. A. MCNAMARA.